United States Patent
Ryu et al.

(10) Patent No.: US 10,601,488 B2
(45) Date of Patent: Mar. 24, 2020

(54) USING IMAGE PROCESSING TO ASSIST WITH BEAMFORMING

(71) Applicant: QUALCOMM Incorporated, San Diego, CA (US)

(72) Inventors: Jung Ho Ryu, Fort Lee, NJ (US); Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/220,774

(22) Filed: Dec. 14, 2018

(65) Prior Publication Data

US 2019/0260455 A1    Aug. 22, 2019

Related U.S. Application Data

(60) Provisional application No. 62/633,357, filed on Feb. 21, 2018.

(51) Int. Cl.
*H04B 7/06* (2006.01)
*G06K 9/00* (2006.01)
(Continued)

(52) U.S. Cl.
CPC ....... *H04B 7/0695* (2013.01); *G06K 9/00664* (2013.01); *G06T 7/246* (2017.01);
(Continued)

(58) Field of Classification Search
CPC .... H04B 7/0695; H04B 7/0617; G06T 7/246; G06T 2207/10044; G06K 9/00664; H04W 16/28; H04W 72/046
See application file for complete search history.

(56) References Cited

U.S. PATENT DOCUMENTS

2016/0277911 A1*  9/2016  Kang ..................... H04W 4/90
2016/0278065 A1*  9/2016  Kim ..................... H04W 72/046
(Continued)

FOREIGN PATENT DOCUMENTS

| EP | 3396869 A1 | 10/2018 |
| KR | 20170073507 A | 6/2017 |
| WO | 2017110732 A1 | 6/2017 |

OTHER PUBLICATIONS

International Search Report and Written Opinion—PCT/US2019/012907—ISA/EPO—Apr. 8, 2019.

*Primary Examiner* — Freshteh N Aghdam

(74) *Attorney, Agent, or Firm* — Harrity & Harrity, LLP/Qualcomm Incorporated

(57) ABSTRACT

Various aspects of the present disclosure generally relate to wireless communication. In some aspects, a wireless communication device may determine a location of an object relative to the wireless communication device, wherein the location is determined based at least in part on a result of processing one or more images that include the object. The wireless communication device may configure at least one of a beam or a beam scan characteristic used to identify the beam to be used by the wireless communication device based at least in part on the location of the object relative to the wireless communication device. The wireless communication device may communicate using the beam. Numerous other aspects are provided.

29 Claims, 11 Drawing Sheets

(51) Int. Cl.
*G06T 7/246* (2017.01)
*H04W 72/04* (2009.01)
*H04W 16/28* (2009.01)
*H04W 64/00* (2009.01)

(52) U.S. Cl.
CPC .......... *H04B 7/0617* (2013.01); *H04W 16/28* (2013.01); *H04W 72/046* (2013.01); *G06T 2207/10044* (2013.01); *H04W 64/00* (2013.01)

(56) References Cited

U.S. PATENT DOCUMENTS

2018/0284217 A1* 10/2018 Takeuchi ................. H01Q 1/22
2019/0261193 A1* 8/2019 Torsner .................... G06T 7/20

\* cited by examiner

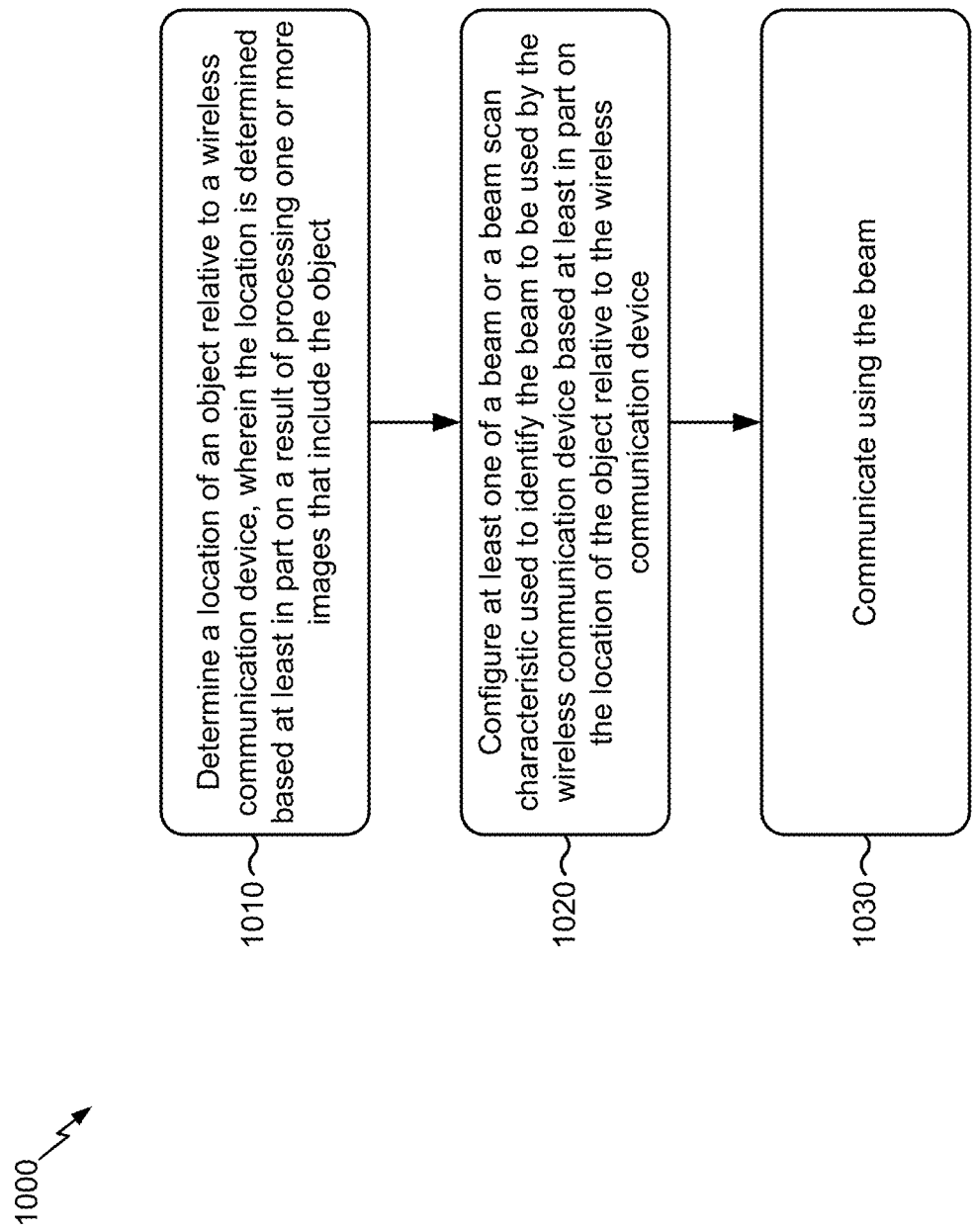

USING IMAGE PROCESSING TO ASSIST WITH BEAMFORMING

CROSS-REFERENCE TO RELATED APPLICATIONS UNDER 35 U.S.C. § 119

This application claims priority to U.S. Provisional Patent Application No. 62/633,357, filed on Feb. 21, 2018, entitled "TECHNIQUES AND APPARATUSES FOR USING IMAGE PROCESSING TO ASSIST WITH BEAMFORMING," which is hereby expressly incorporated by reference herein.

FIELD OF THE DISCLOSURE

Aspects of the present disclosure generally relate to wireless communication, and more particularly to techniques and apparatuses for using image processing to assist with beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining a location of an object relative to the wireless communication device, wherein the location is determined based at least in part on a result of processing one or more images that include the object; configuring at least one of a beam or a beam scan characteristic used to identify the beam to be used by the wireless communication device based at least in part on the location of the object relative to the wireless communication device; and communicating using the beam.

In some aspects, a wireless communication device for wireless communication may include memory and one or more processors operatively coupled to the memory. The memory and the one or more processors may be configured to determine a location of an object relative to the wireless communication device, wherein the location is determined based at least in part on a result of processing one or more images that include the object; configure at least one of a beam or a beam scan characteristic used to identify the beam to be used by the wireless communication device based at least in part on the location of the object relative to the wireless communication device; and communicate using the beam.

In some aspects, a non-transitory computer-readable medium may store one or more instructions for wireless communication. The one or more instructions, when executed by one or more processors of a wireless communication device, may cause the one or more processors to determine a location of an object relative to the wireless communication device, wherein the location is determined based at least in part on a result of processing one or more images that include the object; configure at least one of a beam or a beam scan characteristic used to identify the beam to be used by the wireless communication device based at least in part on the location of the object relative to the wireless communication device; and communicate using the beam.

In some aspects, an apparatus for wireless communication may include means for determining a location of an object relative to the apparatus, wherein the location is determined based at least in part on a result of processing one or more images that include the object; means for configuring at least one of a beam or a beam scan characteristic used to identify the beam to be used by the apparatus based at least in part on the location of the object relative to the apparatus; and means for communicating using the beam.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a wireless communication device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
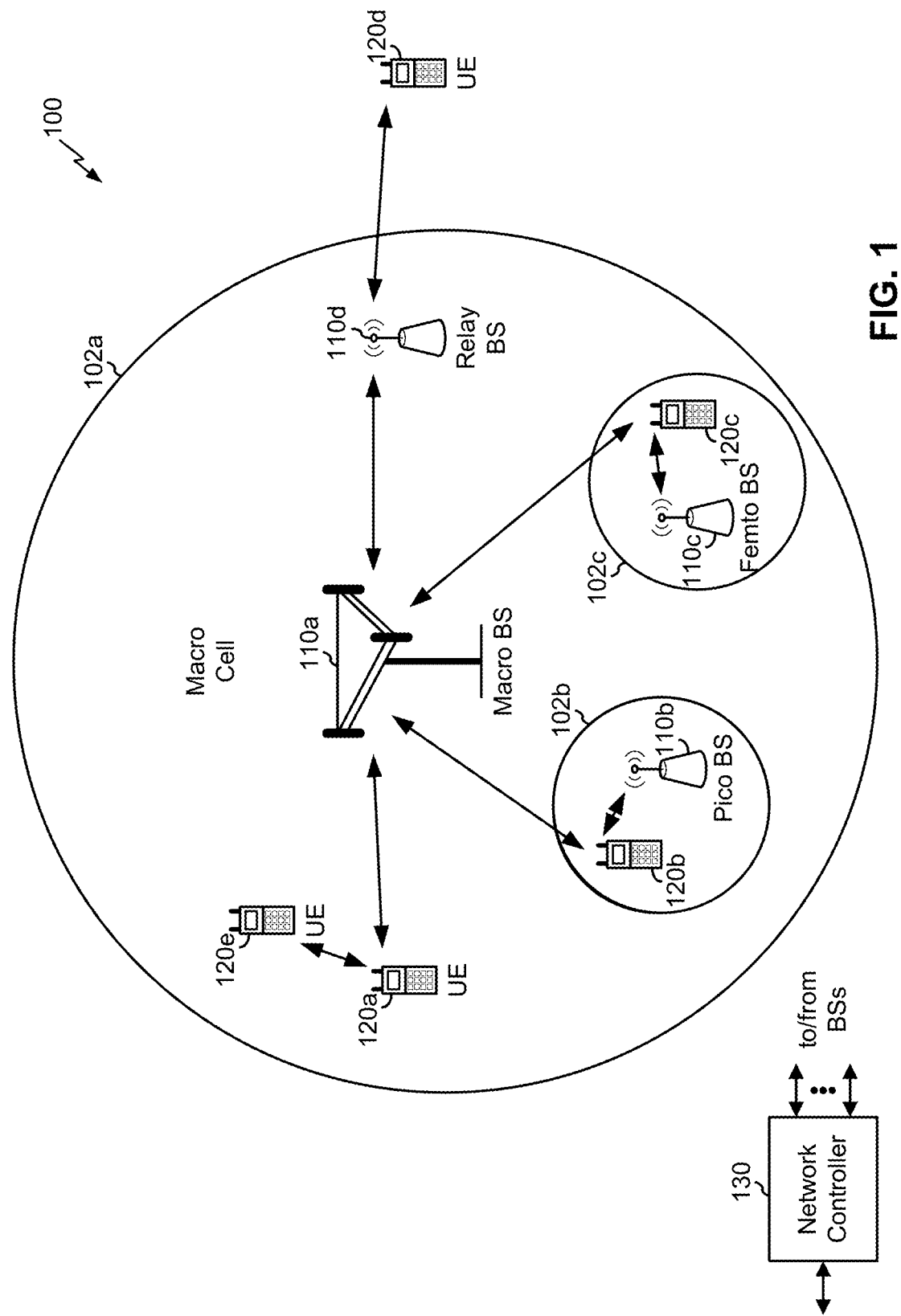
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, the base station 110 and/or the UE 120 may be capable of communicating (e.g., transmitting and/or receiving) using millimeter waves. To improve millimeter wave communication, the base station 110 and/or the UE 120 may use beamforming to focus a directional millimeter wave beam. The base station 110 and/or the UE 120 may use such beams to establish initial millimeter wave links, for control communications, for data communications (e.g., steady state data rate communications, peak data rate communications, and/or the like), and/or the like. Beamforming may be achieved using antenna arrays (e.g., having a size of 16×4, 32×4, 32×8, 64×4, 64×8, 128×16, and/or the like) by combining antenna elements in an antenna array such that signals at particular angles experience constructive interference while signals at other angles experience destructive interference. The base station 110 and/or the UE 120 may use millimeter wave beams to communicate with other devices (e.g., via BS-to-UE communication, UE-to-UE communication, BS-to-BS communication, and/or the like). Additionally, or alternatively, the base station 110 and/or the UE 120 may use millimeter wave radar to track objects in the vicinity of the base station 110 and/or the UE 120, such as by transmitting a millimeter wave signal via one or more beams and monitoring for a return signal.

As indicated above, FIG. 1 is provided merely as an example. Other examples may differ from what is described with regard to FIG. 1.

Figure 2:
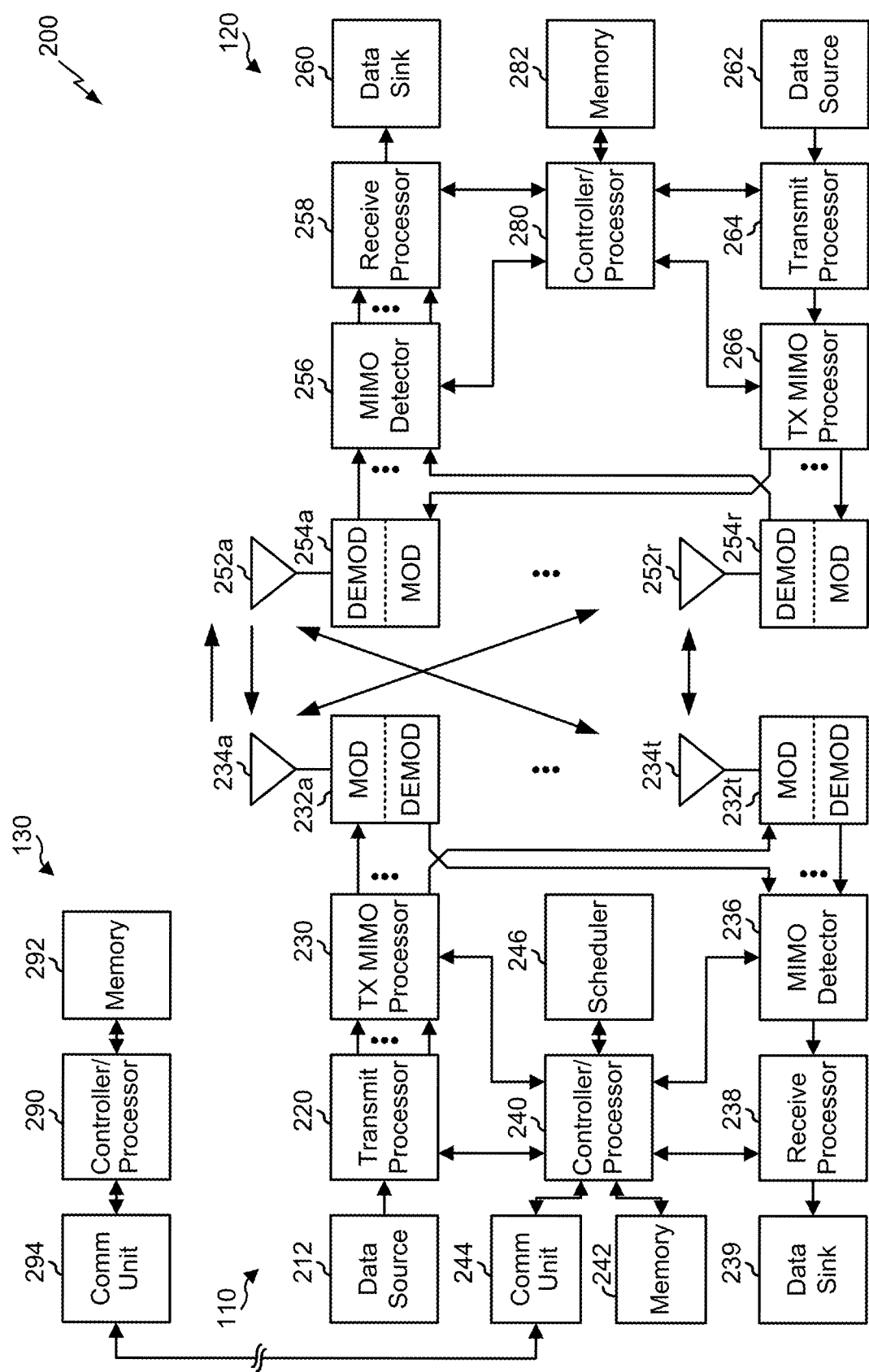
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with using image processing to assist with beamforming, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. A scheduler 246 may schedule UEs for data transmission on the downlink and/or uplink.

In some aspects, base station 110 and/or UE 120 may include means for determining a location of an object relative to a wireless communication device (e.g., the base station 110 and/or the UE 120), wherein the location is determined based at least in part on a result of processing one or more images that include the object; means for configuring at least one of a beam or a beam scan characteristic used to identify the beam to be used by the wireless communication device based at least in part on the location of the object relative to the wireless communication device; means for communicating using the beam; and/or the like. In some aspects, such means may include one or more components of base station 110 and/or UE 120 described in connection with FIG. 2.

As indicated above, FIG. 2 is provided merely as an example. Other examples may differ from what is described with regard to FIG. 2.

Figure 3A:
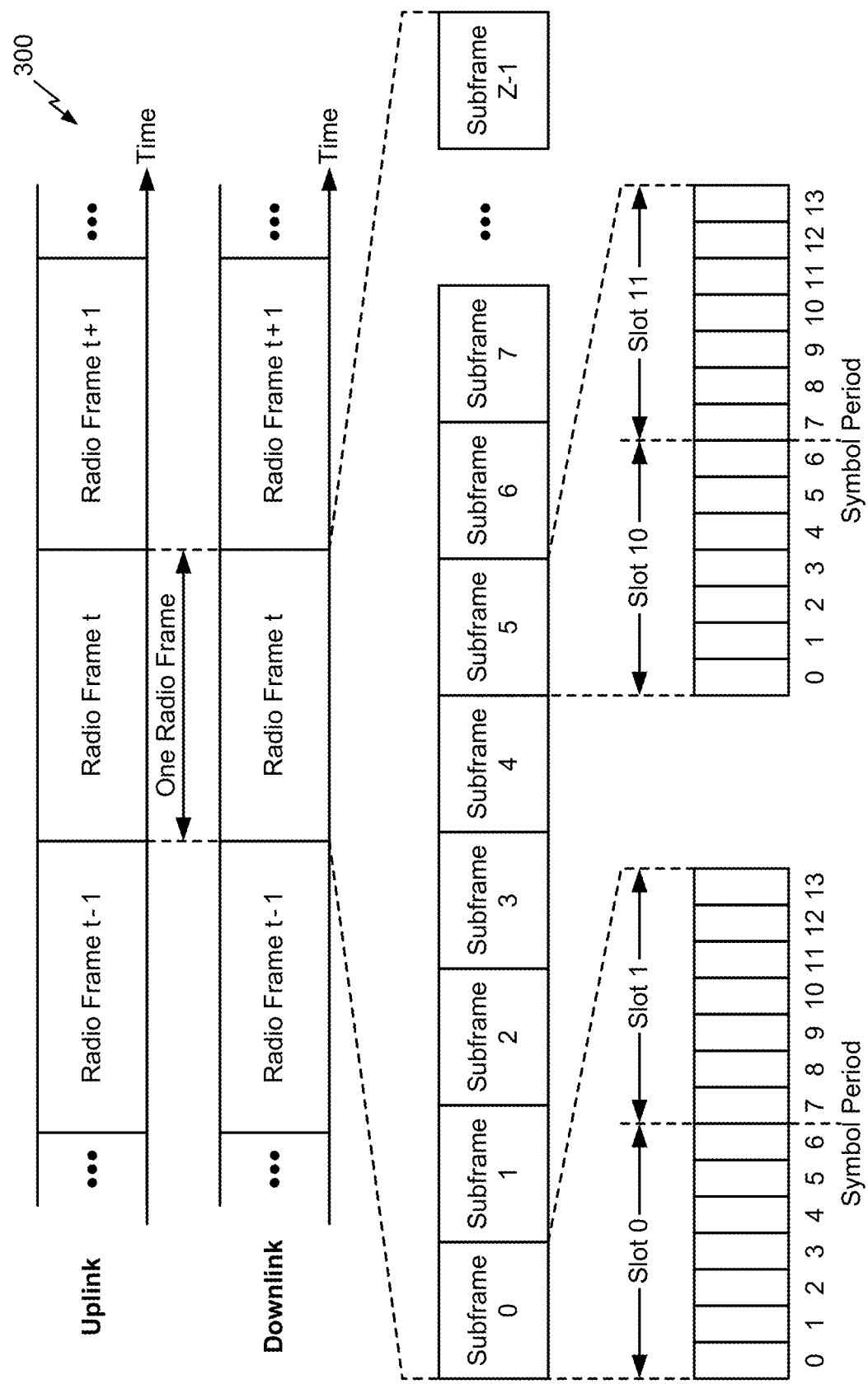
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2 L symbol periods, where the 2 L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
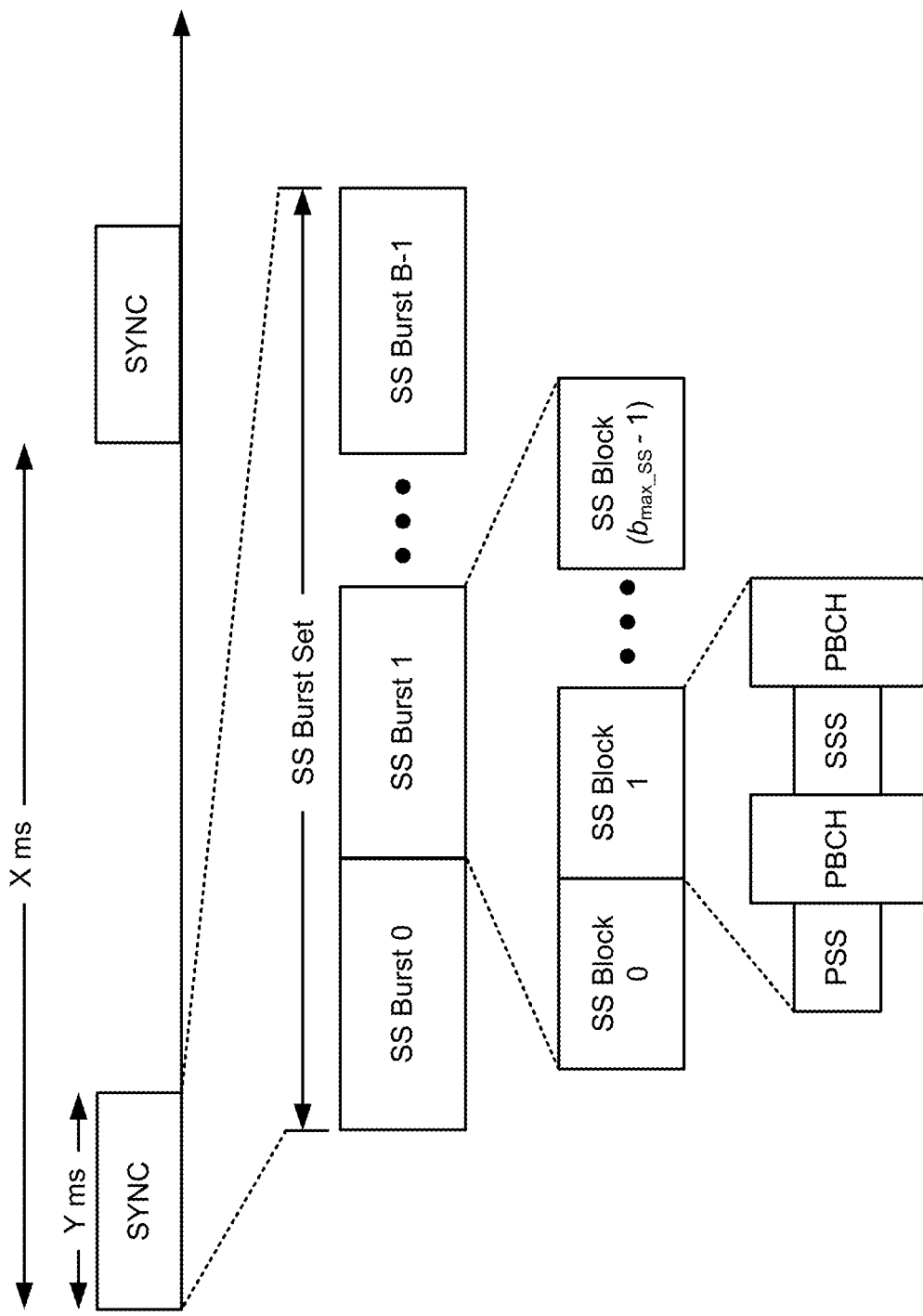
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
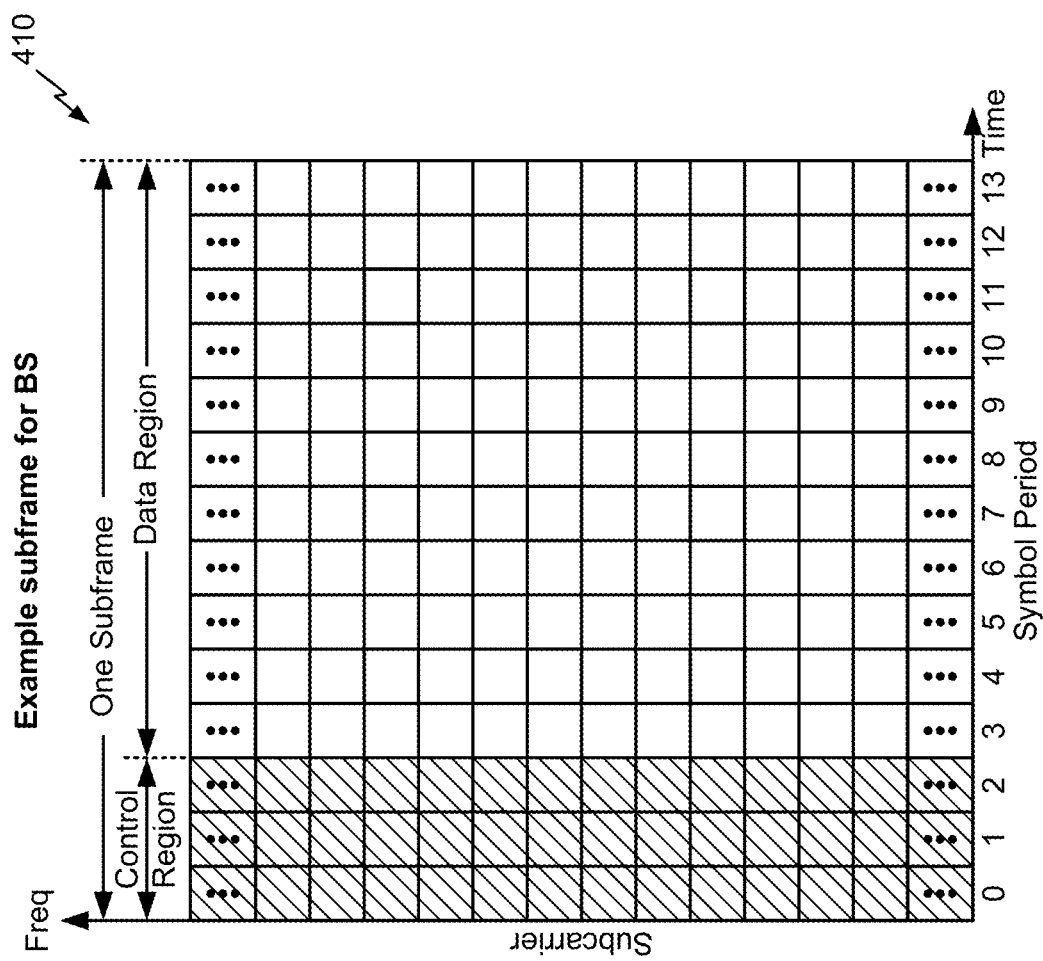
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
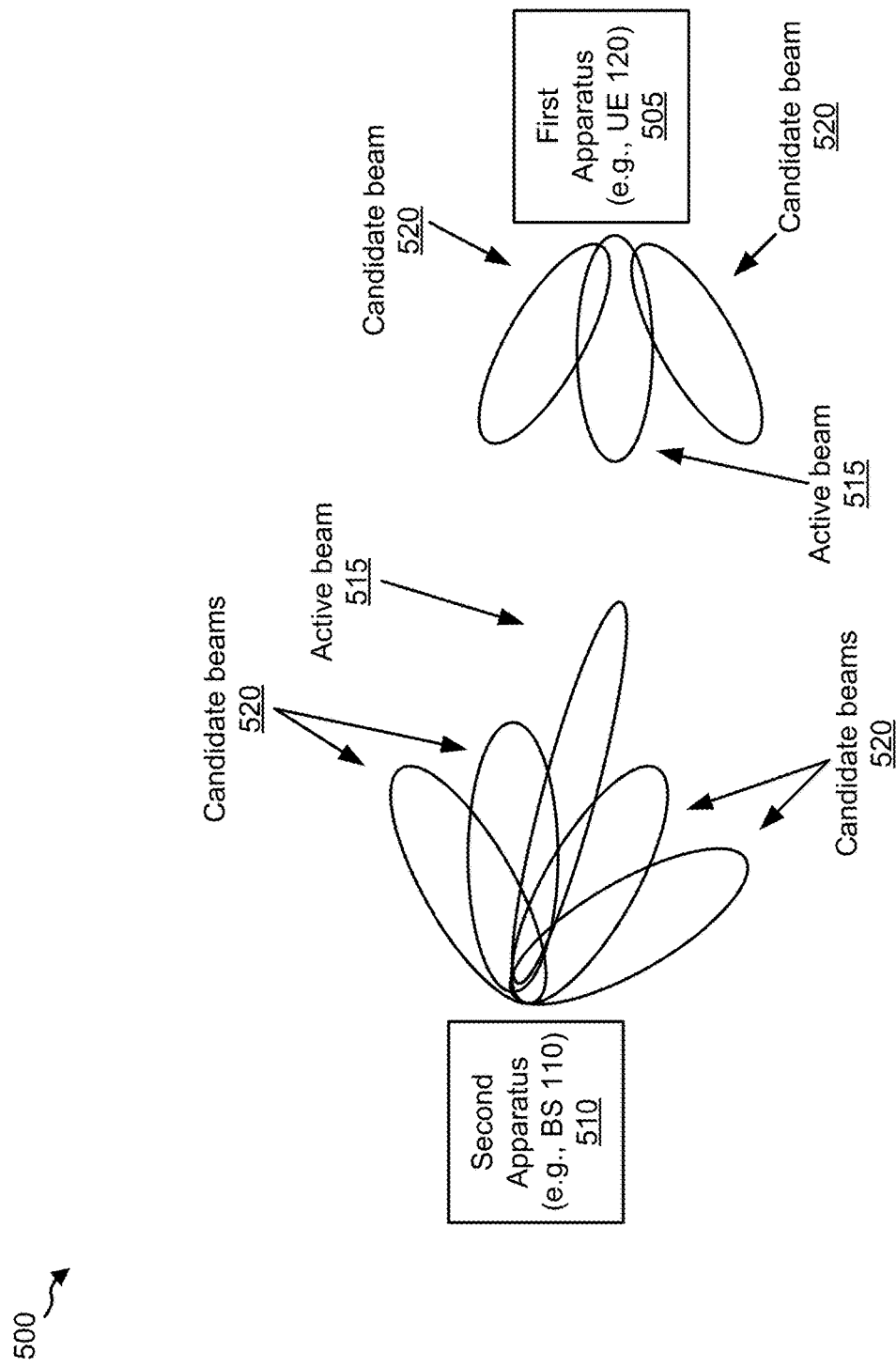
FIG. 5 is a diagram illustrating an example of wireless communication via one or more beams, in accordance with various aspects of the present disclosure.

FIG. 5 is a diagram illustrating an example 500 of wireless communication via one or more beams, in accordance with various aspects of the present disclosure.

As shown in FIG. 5, a first apparatus 505 (e.g., shown as a UE 120 in example 500, but which may be a base station 110) may communicate with a second apparatus 510 (e.g., shown as a base station in example 500, but which may be a UE 120) using one or more beams (e.g., that operate in a millimeter wave radio frequency band). The first apparatus 505 and/or the second apparatus 510 may include one or more wireless communication devices, such as a base station 110, a UE 120, and/or the like. The first apparatus 505 and/or the second apparatus 510 may use beamforming for directional signal transmission and/or reception via a beam, such as by combining elements in an antenna array such that signals at particular angles experience constructive interference while signals at other angles experience destructive interference. Beamforming may be used to improve performance of millimeter wave communications that are vulnerable to propagation loss and diffraction, which may be mitigated by narrowly focusing millimeter wave beams.

In some aspects, the first apparatus 505 and the second apparatus 510 may communicate using an active beam 515. In some aspects, the first apparatus 505 and the second apparatus 510 may also be capable of communicating via one or more candidate beams 520. In some aspects, an active beam 515 may be selected from a set of candidate beams 520 by comparing beam parameters (e.g., RSRP, RSRQ, RSSI, and/or the like) of the set of candidate beams 520, which may be determined by performing a beam scan to determine the beam parameters of multiple beams. For example, an active beam 515 may be the beam that has the best beam parameters among all beams in the set of candidate beams 520 scanned during a beam scan.

However, determining an active beam 515 to be used for communication (e.g., in a particular direction) may be a time-consuming and power-intensive process that consumes a large amount of device resources (e.g., memory resources, processing resources, antenna resources, and/or the like) and network resources (e.g., over-the-air time resources, frequency resources, and/or the like). For example, the base station 110 and/or the UE 120 may be required to perform beam scanning in a wide range of directions to determine a beam to be used as the active beam 515. Some techniques and apparatuses described herein use computer vision and/or image processing to assist with beamforming (e.g., determining an active beam 515). In this way, device resources and/or network resources may be conserved, such as by reducing a number of directions in which beam scanning needs to be performed, permitting a beam direction to be determined faster, and/or the like.

As indicated above, FIG. 5 is provided as an example. Other examples may differ from what is described with respect to FIG. 5.

Figure 6:
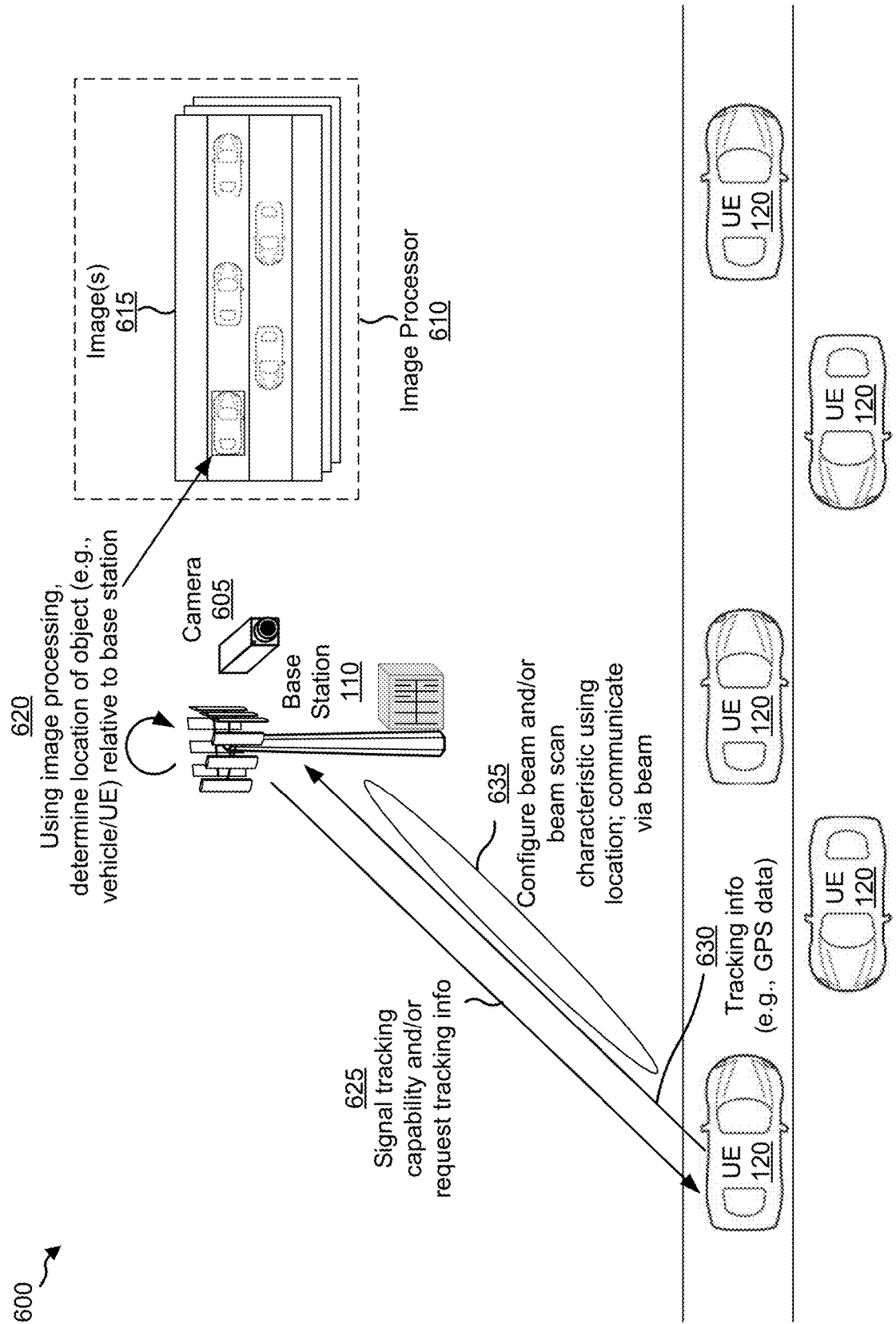
FIGS. 6-9 are diagrams illustrating examples of using image processing to assist with beamforming, in accordance with various aspects of the present disclosure.

FIG. 6 is a diagram illustrating an example 600 of using image processing to assist with beamforming, in accordance with various aspects of the present disclosure. Example 600 is an example where a base station 110 uses image processing to assist with beamforming a beam to be used to communicate with a UE 120 associated with a vehicle.

As shown in FIG. 6, a base station 110 may communicate with a UE 120. As further shown, the base station 110 may be in communication with a camera 605 and/or an image processor 610. The camera 605 may include, for example, a video camera, a still camera, an infra-red camera, a conventional camera, and/or another type of video capture device or image capture device. The camera 605 may obtain one or more images 615 (e.g., a sequence of images that form a video, one or more frames of a video, and/or the like), and may provide the one or more images 615 to the image processor 610. The image processor 610 may process the one or more images 615 to identify one or more objects in the image(s) 615, and/or may determine a location of an object in an image 615 (e.g., a vehicle, a person, a UE 120, and/or the like). In some aspects, the camera 605 and/or the image processor 610 may be integrated into and/or co-located with the base station 110 (e.g., mounted on the base station 110). In some aspects, the camera 605 and/or the image processor 610 may be separate from the base station 110 and/or may not be co-located with the base station 110.

As shown by reference number 620, the base station 110 may determine a location of an object relative to the base station 110. The location of the object may be determined based at least in part on a result of processing one or more images 615 that include the object. In some aspects (e.g., when the base station 110 includes the image processor 610), the base station 110 may determine the location based at least in part on performing image processing on the one or more images 615 to determine a result of the image processing. In some aspects (e.g., when the base station 110 does not include the image processor 610), the base station 110 may determine the location based at least in part on receiving a result of image processing from another device (e.g., a device that includes image processor 610). As described in more detail below, the location of the object associated with the UE 120 may be used to assist with identifying and/or configuring a beam to be used to communicate with the UE 120.

In some aspects, the object may be associated with a UE 120 with which the base station 110 is to communicate (e.g., using a beam identified and/or configured based at least in part on the location of the object). For example, the object may include a vehicle (e.g., a car, a truck, a bus, a watercraft, an aircraft, and/or the like), in which case the UE 120 may be integrated into the vehicle, in communication with a communication system of the vehicle, attached to the vehicle, carried inside of the vehicle, and/or the like. Additionally, or alternatively, the object may include a person, in which case the UE 120 may be carried by the person, worn by the person (e.g., internally or externally), associated with a subscription of the person, and/or the like. Additionally, or alternatively, the object may include the UE 120 (e.g., which may have different forms depending on a type of the UE 120). In example 500, the object is a vehicle, but other types of objects are possible.

As shown by reference number 625, in some aspects, the base station 110 may signal, to the UE 120, a capability of the base station 110 to use a location of the UE 120 to assist with beamforming. For example, the capability may be signaled in a master information block (MIB), a system information block (SIB), a group common PDCCH, a radio resource control (RRC) message, downlink control information (DCI), sidelink control information (SCI), and/or the like.

Additionally, or alternatively, the base station 110 may request, from the UE 120, tracking information associated with the UE 120 to assist with determining a location of the UE 120 from an image 615. The tracking information may indicate, for example, a location of the UE 120 (e.g., using global positioning system (GPS) data and/or the like), a speed at which the UE 120 is moving, an acceleration of the UE 120, a direction in which the UE 120 is moving, a visible characteristic of the UE 120 and/or the object associated with the UE 120, a time at which the tracking information was obtained and/or transmitted, and/or the like. The visible characteristic may include, for example, a color of a vehicle associated with the UE 120, a make of the vehicle, a model of the vehicle, a license plate number of the vehicle, a visible code (e.g., a barcode, a QR code, and/or the like) associated with the vehicle, a picture of a person associated with the UE 120, a color of clothing worn by the person, and/or the like. The tracking information may be used to identify the object in an image 615, and/or to associate the object with the UE 120 so that beamforming can be performed by tracking the object.

As shown by reference number 630, the UE 120 may transmit, and the base station 110 may receive, the tracking information. In some aspects, the base station 110 may use the tracking information to determine and/or store an association between the object and the UE 120 with which the base station 110 is to communicate using a beam. For example, the base station 110 may use a location reported by the UE 120 and a location of an object in an image 615 (e.g., at a particular time or within a time period) to determine that the object is associated with the UE 120 (e.g., because the object and the UE 120 were located at the same location or within a threshold proximity of the same location at the same time or within a threshold time period). Similarly, the base station 110 may use a speed, an acceleration, and/or a direction of movement reported by the UE 120 and a speed, acceleration, and/or direction of movement determined for an object (e.g., using image processing across multiple images 615 over time) to determine that the object is associated with the UE 120. Additionally, or alternatively, the base station 110 may use a visible characteristic of an object, reported by the UE 120, and a visible characteristic of an object, observed in an image 615, to determine that the object is associated with the UE 120. The base station 110 may use a single factor described above or a combination of factors described above to associate an object and a UE 120.

As shown by reference number 635, the base station 110 may configure at least one of a beam or a beam scan characteristic used to identify the beam to be used by the base station 110 based at least in part on the location of the object relative to the base station 110. In some aspects, the base station 110 may configure a beam based at least in part on the location of the object relative to the base station 110. For example, the base station 110 may configure a beam by forming a beam, selecting an active beam from a plurality of candidate beams, switching to a different beam, configuring and/or modifying one or more beam parameters of a beam (e.g., a transmission power of one or more antenna elements, a phase at which a signal is transmitted by one or more antenna elements, an amplitude at which a signal is transmitted by one or more antenna elements, a transmission direction of an antenna array, and/or the like), configuring and/or modifying a direction of a beam, and/or the like. In some aspects, the base station 110 may configure a transmission (Tx) beam to be used by the base station 110 to transmit information (e.g., to a UE 120). Additionally, or alternatively, the base station 110 may configure a reception (Rx) beam to be used by the base station 110 to receive information (e.g., from a UE 120).

In some aspects, the base station 110 may configure a beam to improve speed, quality, reliability, and/or the like of communications with a UE 120 via the beam. For example, the base station 110 may configure a beam in the direction of the UE 120 (to point to a location of the UE 120 and/or a location where the UE 120 is predicted to be according to a speed, acceleration, direction of movement, and/or the like) based at least in part on determining the location of the object, associated with the UE 120, relative to the base station 110. In this way, communications between the UE 120 and the base station 110 may be improved.

In some aspects, the base station 110 may further improve communication by signaling, to the UE 120, a beam configuration to be used by the UE 120 to communicate with the base station 110. The base station 110 may determine the beam configuration to be used by the UE 120 based at least in part on the location of an object, associated with the UE 120, relative to the base station 110. In some aspects, signaling the beam configuration may include indicating an active beam to be selected from a plurality of candidate beams, indicating a beam to be switched to, indicating one or more beam parameters to be used for a beam, indicating a direction to be used for a beam, and/or the like. In some aspects, the base station 110 may transmit a beam configuration for a transmission (Tx) beam to be used by the UE 120 to transmit information (e.g., to the base station 110). Additionally, or alternatively, the base station 110 may transmit a beam configuration for a reception (Rx) beam to be used by the UE 120 to receive information (e.g., from the base station 110).

In some aspects, the base station 110 may configure a beam scan characteristic based at least in part on the location of the object relative to the base station 110. The beam scan characteristic may be used to identify a beam to be used by the base station 110. For example, the beam scan characteristic may include a first range of directions to be scanned, a second range of directions not to be scanned, a frequency with which beams are to be scanned in one or more directions, and/or the like. In some aspects, the base station 110 may determine a location of an object, and may scan beams more frequently in a first direction that is toward the location, and may scan beams less frequently in a second direction that is not toward the location. In some aspects, the base station 110 may scan beams more frequently in directions that are toward objects identified in an image 615, and may scan beams less frequently in directions that are not toward any objects identified in an image 615. In this way, the base station 110 may reduce an amount of time required to identify a beam, may conserve device resources and network resources associated with beamforming and/or beam scanning, and/or the like.

In some aspects, the base station 110 may communicate using the beam. For example, the base station 110 may communicate with the UE 120 via the beam. This communication may include, for example, transmitting information to the UE 120 via the beam and/or receiving information from the UE 120 via the beam. By using image processing to determine a location of an object associated with a UE 120, and using the location to assist with beamforming, the base station 110 and the UE 120 may quickly establish communication via a beam, may improve a speed, quality, and/or reliability of communications, may conserve device resources (e.g., of base station 110 and/or UE 120) associated with beamforming, and/or the like.

In some aspects, the base station 110 may reconfigure a beam and/or a beam scan characteristic (e.g., after an initial configuration) by performing one or more operations described herein. For example, the base station 110 may reconfigure a beam and/or a beam scan characteristic as a UE 120 and/or an object associated with the UE 120 moves. In this case, the base station 110 may, for example, determine an updated location of the object, and may reconfigure the beam and/or the beam scan characteristics based at least in part on the updated location, in a similar manner as described above. In this way, the base station 110 may efficiently configure beams to maintain a connection with the UE 120.

As indicated above, FIG. 6 is provided as an example. Other examples may differ from what is described with respect to FIG. 6.

Figure 7:
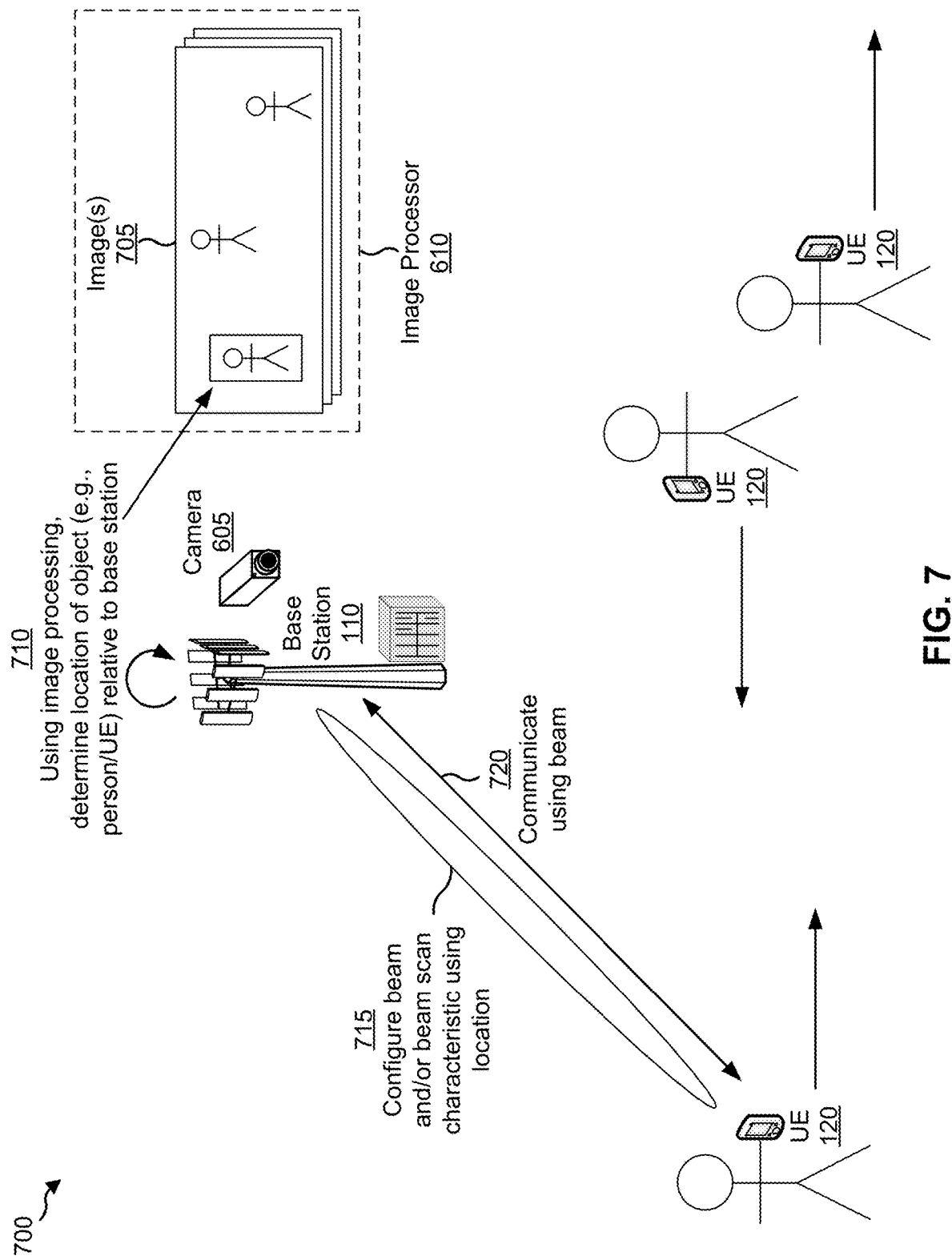

FIG. 7 is a diagram illustrating an example 700 of using image processing to assist with beamforming, in accordance with various aspects of the present disclosure. Example 700 is an example where a base station 110 uses image processing to assist with beamforming a beam to be used to communicate with a UE 120 associated with a person.

As shown in FIG. 7, a base station 110 may communicate with a UE 120. As further shown, the base station 110 may be in communication with a camera 605 and/or an image processor 610 that captures and/or analyzes one or more images 705, as described above in connection with FIG. 6.

As shown by reference number 710, the base station 110 may determine a location of an object relative to the base station 110, as described above in connection with FIG. 6. In example 700, the object is a person, but other types of objects are possible.

In some aspects, the base station 110 may signal, to the UE 120, a capability of the base station 110 to use a location of the UE 120 to assist with beamforming, as described above in connection with FIG. 6. Additionally, or alternatively, the base station 110 may request, from the UE 120, tracking information associated with the UE 120 to assist with determining a location of the UE 120 from an image 705, as described above in connection with FIG. 6. In some aspects, the UE 120 may transmit, and the base station 110 may receive, the tracking information, as described above in connection with FIG. 6.

As shown by reference number 715, the base station 110 may configure at least one of a beam or a beam scan characteristic based at least in part on the location of the object relative to the base station 110, as described above in connection with FIG. 6. Additionally, or alternatively, the base station 110 may signal, to the UE 120, a beam configuration to be used by the UE 120 to communicate with the base station 110, as described above in connection with FIG. 6.

As shown by reference number 720, the base station 110 may communicate using the beam, as described above in connection with FIG. 6. By using image processing to determine a location of an object associated with a UE 120, and using the location to assist with beamforming, the base station 110 and the UE 120 may quickly establish communication via a beam, may improve a speed, quality, and/or reliability of communications, may conserve device resources (e.g., of base station 110 and/or UE 120) associated with beamforming, and/or the like.

In some aspects, the base station 110 may reconfigure a beam and/or a beam scan characteristic, as described above in connection with FIG. 6. In this way, the base station 110 may efficiently configure beams to maintain a connection with the UE 120.

As indicated above, FIG. 7 is provided as an example. Other examples may differ from what is described with respect to FIG. 7.

Figure 8:
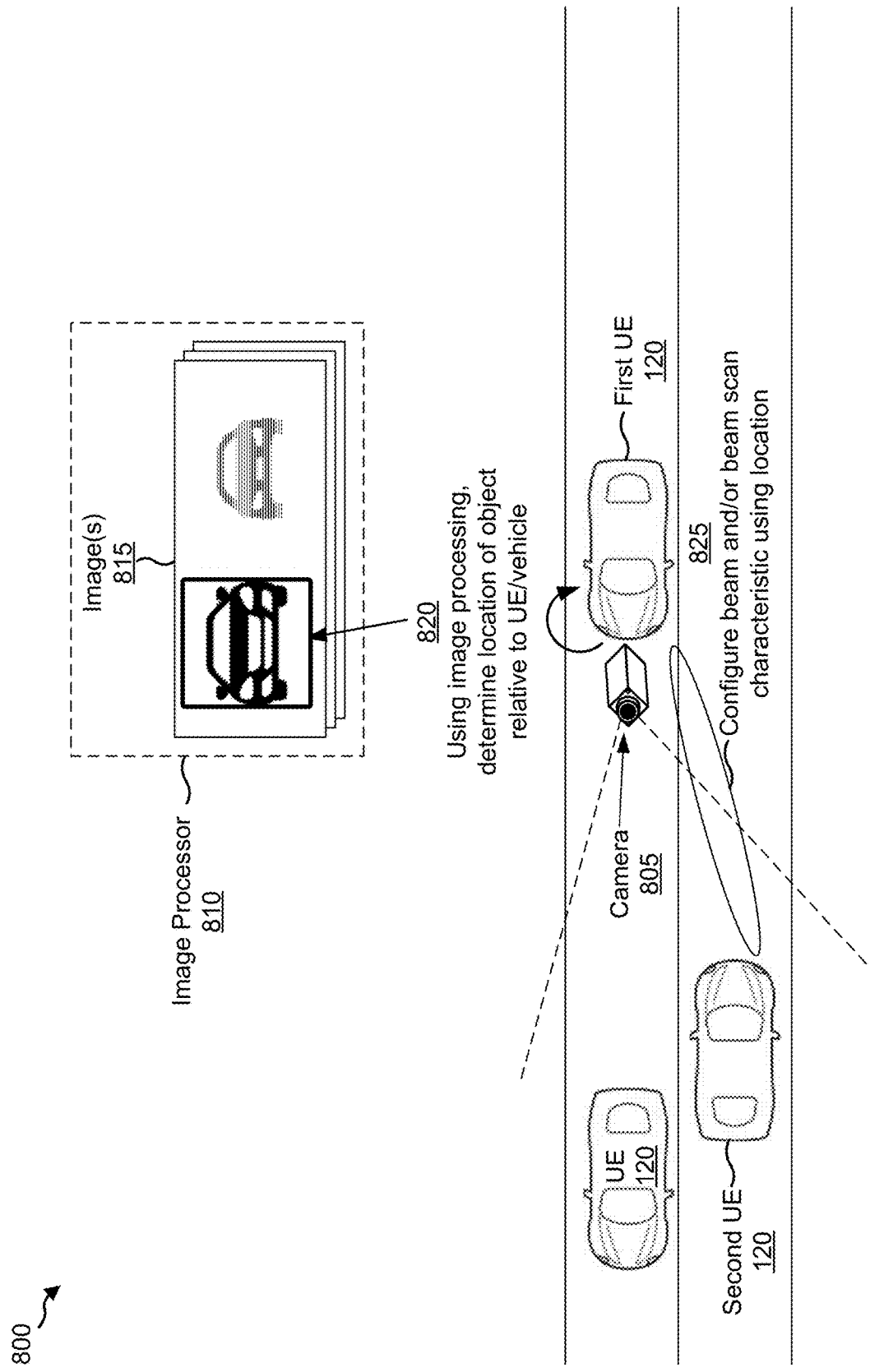

FIG. 8 is a diagram illustrating an example 800 of using image processing to assist with beamforming, in accordance with various aspects of the present disclosure. Example 800 is an example where a first UE 120 uses image processing to assist with beamforming a beam to be used to communicate with a second UE 120. In example 800, the first UE 120 and the second UE 120 are associated with vehicles. In some aspects, the first UE 120 and/or the second UE 120 may be associated with another type of object, such as a person.

As shown in FIG. 8, a first UE 120 may communicate with one or more other UEs 120, which may include a second UE 120. As further shown, the first UE 120 may be in communication with a camera 805 and/or an image processor 810. The camera 805 may include, for example, a video camera, a still camera, an infra-red camera, a conventional camera, and/or another type of video capture device or image capture device. The camera 805 may obtain one or more images 815 (e.g., a sequence of images that form a video, one or more frames of a video, and/or the like), and may provide the one or more images 815 to the image processor 810. The image processor 810 may process the one or more images 815 to identify one or more objects in the image(s) 815, and/or may determine a location of an object in an image 815 (e.g., a vehicle, a person, a UE 120, and/or the like). In some aspects, the camera 805 and/or the image processor 810 may be integrated into and/or co-located with the first UE 120 and/or an object associated with the first UE 120 (e.g., mounted on the first UE 120 and/or the object, such as a vehicle). In some aspects, the camera 805 and/or the image processor 810 may be separate from the first UE 120 and/or may not be co-located with the first UE 120 and/or the object associated with the first UE 120.

As shown by reference number 820, the first UE 120 may determine a location of an object relative to the first UE 120, in a similar manner as described above in connection with FIG. 6. In some aspects (e.g., when the first UE 120 includes the image processor 810), the first UE 120 may determine the location based at least in part on performing image processing on the one or more images 815 to determine a result of the image processing. In some aspects (e.g., when the first UE 120 does not include the image processor 810), the first UE 120 may determine the location based at least in part on receiving a result of image processing from another device (e.g., a device that includes image processor 810). In some aspects, the object may be associated with a second UE 120 with which the first UE 120 is to communicate. For example, the object may include a vehicle, a person, the second UE 120, and/or the like, as described above in connection with FIG. 6. In example 800, the object is a vehicle, but other types of objects are possible.

In some aspects, the first UE 120 may signal, to the second UE 120, a capability of the first UE 120 to use a location of the second UE 120 to assist with beamforming, in a similar manner as described above in connection with FIG. 6. Additionally, or alternatively, the first UE 120 may request, from the second UE 120, tracking information associated with the second UE 120 to assist with determining a location of the second UE 120 from an image 815, in a similar manner as described above in connection with FIG. 6. In some aspects, the second UE 120 may transmit, and the first UE 120 may receive, the tracking information, in a similar manner as described above in connection with FIG. 6.

As shown by reference number 825, the first UE 120 may configure at least one of a beam or a beam scan characteristic based at least in part on the location of the object relative to the first UE 120, in a similar manner as described above in connection with FIG. 6. Additionally, or alternatively, the first UE 120 may signal, to the second UE 120, a beam configuration to be used by the second UE 120 to communicate with the first UE 120, in a similar manner as described above in connection with FIG. 6.

The first UE 120 may communicate using the beam, in a similar manner as described above in connection with FIG. 6. By using image processing to determine a location of an object associated with a second UE 120, and using the location to assist with beamforming, the first UE 120 and the second UE 120 may quickly establish communication via a beam, may improve a speed, quality, and/or reliability of communications, may conserve device resources (e.g., of the first UE 120 and/or the second UE 120) associated with beamforming, and/or the like.

In some aspects, the first UE 120 may reconfigure a beam and/or a beam scan characteristic, in a similar manner as described above in connection with FIG. 6. In this way, the first UE 120 may efficiently configure beams to maintain a connection with the second UE 120.

As indicated above, FIG. 8 is provided as an example. Other examples may differ from what is described with respect to FIG. 8.

Figure 9:
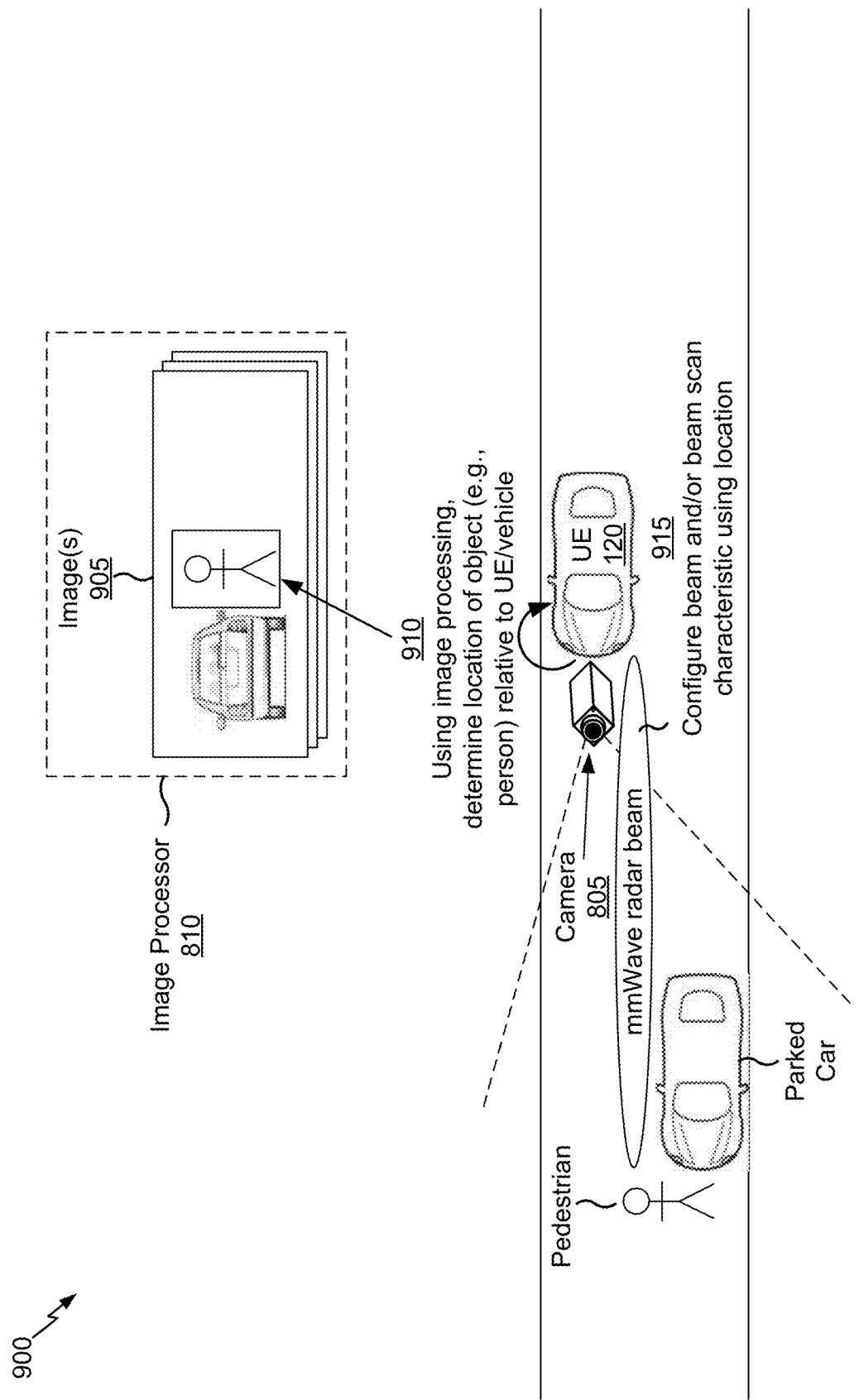

FIG. 9 is a diagram illustrating an example 900 of using image processing to assist with beamforming, in accordance with various aspects of the present disclosure. Example 900 is an example where a UE 120 uses image processing to assist with beamforming a beam to be used for millimeter wave radar.

As shown in FIG. 9, a UE 120 may use millimeter wave radar to detect one or more objects (e.g., for collision avoidance, steering control, and/or the like). As further shown, the UE 120 may be in communication with a camera 805 and/or an image processor 810 that captures and/or analyzes one or more images 905, in a similar manner as described above in connection with FIGS. 6-8.

As shown by reference number 910, the UE 120 may determine a location of an object relative to the UE 120, in a similar manner as described above in connection with FIGS. 6-8. In some aspects, the object may include a vehicle, a person, an animal, a stationary object (e.g., a building, a traffic sign, a traffic signal, and/or the like), and/or the like. In example 900, the object is a person, but other types of objects are possible.

As shown by reference number 915, the UE 120 may configure at least one of a beam or a beam scan characteristic based at least in part on the location of the object relative to the UE 120. In some aspects, the beam is a millimeter wave radar beam used for millimeter wave radar. For example, the UE 120 may use millimeter wave radar to track objects in the vicinity of the UE 120, such as by transmitting a millimeter wave signal via one or more beams and monitoring for a return signal.

In this case, the UE 120 may configure the beam and/or the beam scan characteristic by configuring a rate of transmission of the millimeter wave radar beam. For example, the UE 120 may configure millimeter wave radar beam transmissions to occur more frequently in one or more directions toward the location of the object, and/or may configure millimeter wave radar beam transmissions to occur less frequently in one or more directions that are not toward the location of the object. In this way, the UE 120 may respond faster to objects (e.g., for collision avoidance).

Additionally, or alternatively, the UE 120 may configure the beam and/or the beam scan characteristic by configuring a width of the millimeter wave radar beam. For example, the UE 120 may configure narrower millimeter wave radar beams in one or more directions toward the location of the object, and/or may configure wider millimeter wave radar beam transmissions in one or more directions that are not toward the location of the object. In this way, the UE 120 may obtain more accurate radar images in a location of interest (e.g., for collision avoidance).

Additionally, or alternatively, the UE 120 may configure the beam and/or the beam scan characteristic by configuring a direction of the millimeter wave radar beam. For example, the UE 120 may configure transmission of millimeter wave radar beams in one or more directions toward the location of the object, and/or may not configure transmission of a millimeter wave radar beams in one or more directions that are not toward the location of the object. In this way, the UE 120 may focus a millimeter wave radar beam toward a location of interest (e.g., for collision avoidance). Furthermore, resources of the UE 120 (e.g., processor resources, memory resources, battery power, and/or the like) may be conserved by configuring millimeter wave radar beams in fewer than all directions.

Additionally, or alternatively, the UE 120 may configure the beam and/or the beam scan characteristic by configuring a signal characteristic and/or a signal frequency of the millimeter wave radar beam. For example, the UE 120 may configure a millimeter wave radar beam with different frequencies for different types of objects (e.g., a first frequency for a person, a second frequency for a car, a third frequency for a truck, and/or the like), which may result in better radar imaging. Additionally, or alternatively, the UE 120 may configure a millimeter wave radar beam with different phases, different amplitudes, and/or the like for different types of objects, which may result in better radar imaging.

The UE 120 may communicate using the millimeter wave radar beam, such as by transmitting one or more millimeter wave signals via the millimeter wave radar beam and monitoring for a return signal. By using image processing to determine a location of an object, and using the location to assist with beamforming and/or transmission of millimeter wave radar beams, the UE 120 may improve a speed, quality, and/or reliability of millimeter wave radar, may conserve device resources (e.g., of the UE 120) associated with beamforming and/or transmitting millimeter wave radar beams, may improve collision avoidance, and/or the like.

As indicated above, FIG. 9 is provided as an example. Other examples may differ from what is described with respect to FIG. 9.

FIG. 10 is a diagram illustrating an example process 1000 performed, for example, by a wireless communication device, in accordance with various aspects of the present disclosure. Example process 1000 is an example where a wireless communication device (e.g., a base station 110, a UE 120, and/or the like) uses image processing to assist with beamforming.

As shown in FIG. 10, in some aspects, process 1000 may include determining a location of an object relative to a wireless communication device, wherein the location is determined based at least in part on a result of processing one or more images that include the object (block 1010). For example, the wireless communication device (e.g., using controller/processor 240, controller/processor 280, and/or the like) may determine a location of an object relative to the wireless communication device, as described above in connection with FIGS. 6-9. In some aspects, the location is determined based at least in part on a result of processing one or more images that include the object.

As further shown in FIG. 10, in some aspects, process 1000 may include configuring at least one of a beam or a beam scan characteristic used to identify the beam to be used by the wireless communication device based at least in part on the location of the object relative to the wireless communication device (block 1020). For example, the wireless communication device (e.g., using controller/processor 240, controller/processor 280, and/or the like) may configure at least one of a beam or a beam scan characteristic used to identify the beam to be used by the wireless communication device based at least in part on the location of the object relative to the wireless communication device, as described above in connection with FIGS. 6-9.

As further shown in FIG. 10, in some aspects, process 1000 may include communicating using the beam (block 1030). For example, the wireless communication device (e.g., using transmit processor 220, TX MIMO processor 230, MOD/DEMOD 232, antenna 234, MIMO detector 236, receive processor 238, controller/processor 240, antenna 252, MOD/DEMOD 254, MIMO detector 256, receive processor 258, transmit processor 264, TX MIMO processor 266, controller/processor 280, and/or the like) may communicate using the beam, as described above in connection with FIGS. 6-9.

Process 1000 may include additional aspects, such as any single aspect or any combination of aspects described below.

In some aspects, the object is associated with a user equipment with which the wireless communication device is to communicate via the beam. In some aspects, the beam is a millimeter wave radar beam used for millimeter wave radar. In some aspects, configuring at least one of the beam or the beam scan characteristic comprises at least one of: configuring a rate of transmission of the millimeter wave radar beam, configuring a width of the millimeter wave radar beam, configuring a direction of the millimeter wave radar beam, configuring a signal characteristic of the millimeter wave radar beam, configuring a signal frequency of the millimeter wave radar beam, or some combination thereof.

In some aspects, the wireless communication device may signal, to a user equipment (UE) associated with the object, a capability of the wireless communication device to use a location of the UE to assist with beamforming. In some aspects, the wireless communication device may determine an association between the object and a user equipment (UE) with which the wireless communication device is to communicate via the beam. In some aspects, the association is determined based at least in part on at least one of: the location of the object and a location reported by the UE, a speed of the object and a speed reported by the UE, an acceleration of the object and an acceleration reported by the UE, a direction in which the object is moving and a direction reported by the UE, a visible characteristic detected for the object in the one or more images and an indication, reported by the UE, of a visible characteristic of the object, or some combination thereof. In some aspects, the location reported by the UE includes global positioning system data.

In some aspects, the wireless communication device may determine an updated location associated with the object and reconfigure at least one of the beam or the beam scan characteristic based at least in part on the updated location. In some aspects, communicating using the beam includes transmitting information to a user equipment (UE) or receiving information from the UE via the beam. In some aspects, the wireless communication device may signal a beam configuration for the UE based at least in part on the location of the object relative to the wireless communication device.

In some aspects, the location is determined based at least in part on at least one of: global positioning system (GPS) data received from a user equipment associated with the object, a speed associated with the object, an acceleration associated with the object, a direction in which the object is moving, a visible characteristic of the object, or some combination thereof. In some aspects, the object includes at least one of: a user equipment, a vehicle, a person, or some combination thereof.

In some aspects, the one or more images are one or more frames of a video. In some aspects, the one or more images are processed by the wireless communication device. In some aspects, the result of processing the one or more images is received by the wireless communication device from another device that processes the one or more images.

In some aspects, configuring at least one of the beam or the beam scan characteristic comprises at least one of: modifying one or more beam parameters, modifying a direction of the beam, modifying a rate of radar transmissions transmitted in a direction of the beam, switching to a different beam, or some combination thereof. In some aspects, configuring at least one of the beam or the beam scan characteristic comprises scanning beams more frequently in a first direction that is toward the location as compared to a second direction that is not toward the location.

In some aspects, the wireless communication device is a base station. In some aspects, the wireless communication device is a user equipment.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   determining a location of an object relative to the wireless communication device, wherein the location is determined based at least in part on a result of processing one or more images that include the object;
   configuring at least one of a beam or a beam scan characteristic used to identify the beam to be used by the wireless communication device based at least in part on the location of the object relative to the wireless communication device;
   determining an updated location associated with the object;
   reconfiguring at least one of the beam or the beam scan characteristic based at least in part on the updated location; and
   communicating using the reconfigured beam.

2. The method of claim 1, wherein the object is associated with a user equipment with which the wireless communication device is to communicate via the beam.

3. The method of claim 1, wherein the beam is a millimeter wave radar beam used for millimeter wave radar.

4. The method of claim 3, wherein configuring at least one of the beam or the beam scan characteristic comprises at least one of:
   configuring a rate of transmission of the millimeter wave radar beam,
   configuring a width of the millimeter wave radar beam,
   configuring a direction of the millimeter wave radar beam,
   configuring a signal characteristic of the millimeter wave radar beam,
   configuring a signal frequency of the millimeter wave radar beam, or
   some combination thereof.

5. The method of claim 1, further comprising signaling, to a user equipment (UE) associated with the object, a capability of the wireless communication device to use a location of the UE to assist with beamforming.

6. The method of claim 1, further comprising determining an association between the object and a user equipment (UE) with which the wireless communication device is to communicate via the beam.

7. The method of claim 6, wherein the association is determined based at least in part on at least one of:
   the location of the object and a location reported by the UE,
   a speed of the object and a speed reported by the UE,
   an acceleration of the object and an acceleration reported by the UE,
   a direction in which the object is moving and a direction reported by the UE,
   a visible characteristic detected for the object in the one or more images and an indication, reported by the UE, of a visible characteristic of the object, or
   some combination thereof.

8. The method of claim 7, wherein the location reported by the UE includes global positioning system data.

9. The method of claim 1, wherein the communicating includes transmitting information to a user equipment (UE) or receiving information from the UE via the beam.

10. The method of claim 9, further comprising signaling a beam configuration for the UE based at least in part on the location of the object relative to the wireless communication device.

11. The method of claim 1, wherein the location is determined based at least in part on at least one of:
    global positioning system (GPS) data received from a user equipment associated with the object,
    a speed associated with the object,
    an acceleration associated with the object,
    a direction in which the object is moving,
    a visible characteristic of the object, or
    some combination thereof.

12. The method of claim 1, wherein the object includes at least one of:
    a user equipment,
    a vehicle,
    a person, or
    some combination thereof.

13. The method of claim 1, wherein the one or more images are one or more frames of a video.

14. The method of claim 1, wherein the one or more images are processed by the wireless communication device, or wherein the result of processing the one or more images is received by the wireless communication device from another device that processes the one or more images.

15. The method of claim 1, wherein configuring at least one of the beam or the beam scan characteristic comprises at least one of:
    modifying one or more beam parameters,
    modifying a direction of the beam, modifying a rate of radar transmissions transmitted in a direction of the beam,
switching to a different beam,
scanning beams more frequently in a first direction that is toward the location as compared to a second direction that is not toward the location, or
some combination thereof.

16. The method of claim 1, wherein the wireless communication device is a base station or a user equipment.

17. A wireless communication device, comprising:
memory; and
one or more processors coupled to the memory, the memory and the one or more processors configured to:
determine a location of an object relative to the wireless communication device, wherein the location is determined based at least in part on a result of processing one or more images that include the object;
configure at least one of a beam or a beam scan characteristic used to identify the beam to be used by the wireless communication device based at least in part on the location of the object relative to the wireless communication device;
determine an updated location associated with the object;
reconfigure at least one of the beam or the beam scan characteristic based at least in part on the updated location; and
communicate using the reconfigured beam.

18. The wireless communication device of claim 17, wherein the object is associated with a user equipment with which the wireless communication device is to communicate via the beam.

19. The wireless communication device of claim 17, wherein the beam is a millimeter wave radar beam used for millimeter wave radar.

20. The wireless communication device of claim 19, wherein the one or more processors, when configuring at least one of the beam or the beam scan characteristic, are configured to at least one of:
configure a rate of transmission of the millimeter wave radar beam,
configure a width of the millimeter wave radar beam,
configure a direction of the millimeter wave radar beam,
configure a signal characteristic of the millimeter wave radar beam,
configure a signal frequency of the millimeter wave radar beam, or
some combination thereof.

21. The wireless communication device of claim 17, wherein the one or more processors are further configured to determine an association between the object and a user equipment (UE) with which the wireless communication device is to communicate via the beam.

22. The wireless communication device of claim 21, wherein the association is determined based at least in part on at least one of:
the location of the object and a location reported by the UE,
a speed of the object and a speed reported by the UE,
an acceleration of the object and an acceleration reported by the UE,
a direction in which the object is moving and a direction reported by the UE,
a visible characteristic detected for the object in the one or more images and an indication, reported by the UE, of a visible characteristic of the object, or
some combination thereof.

23. The wireless communication device of claim 17, wherein the one or more processors, when configuring at least one of the beam or the beam scan characteristic, are configured to at least one of:
modify one or more beam parameters,
modify a direction of the beam,
modify a rate of radar transmissions transmitted in a direction of the beam,
switch to a different beam,
scan beams more frequently in a first direction that is toward the location as compared to a second direction that is not toward the location, or
some combination thereof.

24. A non-transitory computer-readable medium storing one or more instructions for wireless communication, the one or more instructions comprising:
one or more instructions that, when executed by one or more processors of a wireless communication device, cause the one or more processors to:
determine a location of an object relative to the wireless communication device, wherein the location is determined based at least in part on a result of processing one or more images that include the object;
configure at least one of a beam or a beam scan characteristic used to identify the beam to be used by the wireless communication device based at least in part on the location of the object relative to the wireless communication device;
determine an updated location associated with the object;
reconfigure at least one of the beam or the beam scan characteristic based at least in part on the updated location; and
communicate using the reconfigured beam.

25. The non-transitory computer-readable medium of claim 24, wherein the object is associated with a user equipment with which the wireless communication device is to communicate via the beam; and
wherein the one or more instructions, that cause the one or more processors to configure at least one of the beam or the beam scan characteristic, further cause the one or more processors to at least one of:
modify one or more beam parameters,
modify a direction of the beam,
modify a rate of radar transmissions transmitted in a direction of the beam,
switch to a different beam,
scan beams more frequently in a first direction that is toward the location as compared to a second direction that is not toward the location, or
some combination thereof.

26. The non-transitory computer-readable medium of claim 24, wherein the beam is a millimeter wave radar beam used for millimeter wave radar; and
wherein the one or more instructions, that cause the one or more processors to configure at least one of the beam or the beam scan characteristic, further cause the one or more processors to at least one of:
configure a rate of transmission of the millimeter wave radar beam,
configure a width of the millimeter wave radar beam,
configure a direction of the millimeter wave radar beam,
configure a signal characteristic of the millimeter wave radar beam,
configure a signal frequency of the millimeter wave radar beam, or some combination thereof.

27. An apparatus for wireless communication, comprising:
- means for determining a location of an object relative to the apparatus, wherein the location is determined based at least in part on a result of processing one or more images that include the object;
- means for configuring at least one of a beam or a beam scan characteristic used to identify the beam to be used by the apparatus based at least in part on the location of the object relative to the apparatus;
- means for determine an updated location associated with the object;
- means for reconfigure at least one of the beam or the beam scan characteristic based at least in part on the updated location; and
- means for communicating using the reconfigured beam.

28. The apparatus of claim 27, further comprising means for determining an association between the object and a user equipment (UE) with which the apparatus is to communicate via the beam.

29. The apparatus of claim 28, wherein the association is determined based at least in part on at least one of:
- the location of the object and a location reported by the UE,
- a speed of the object and a speed reported by the UE,
- an acceleration of the object and an acceleration reported by the UE,
- a direction in which the object is moving and a direction reported by the UE,
- a visible characteristic detected for the object in the one or more images and an indication, reported by the UE, of a visible characteristic of the object, or
- some combination thereof.

* * * * *